United States Patent
Walling et al.

(10) Patent No.: US 7,939,970 B1
(45) Date of Patent: May 10, 2011

(54) VARIABLE FREQUENCY WIND PLANT

(75) Inventors: Reigh Allen Walling, Clifton Park, NY (US); Einar Vaughn Larsen, Ballston Park, NY (US); Robert William Delmerico, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/843,198

(22) Filed: Jul. 26, 2010

(51) Int. Cl.
*H02J 1/00* (2006.01)
*H02J 3/00* (2006.01)
*H02P 9/04* (2006.01)
*F03D 9/00* (2006.01)

(52) U.S. Cl. .......................... 307/84; 290/44
(58) Field of Classification Search ............... 307/84; 290/44
See application file for complete search history.

(56) References Cited

U.S. PATENT DOCUMENTS

| 5,083,039 | A * | 1/1992 | Richardson et al. ........... 290/44 |
| 5,155,375 | A * | 10/1992 | Holley ........................... 290/44 |
| 6,680,856 | B2 | 1/2004 | Schreiber |
| 6,858,953 | B2 * | 2/2005 | Stahlkopf ....................... 290/44 |
| 2003/0185665 | A1 * | 10/2003 | Hansen ........................... 415/1 |
| 2006/0273595 | A1 * | 12/2006 | Avagliano et al. ............. 290/44 |
| 2008/0137382 | A1 | 6/2008 | Datta et al. |
| 2010/0078940 | A1 * | 4/2010 | Kondo et al. ................... 290/44 |

* cited by examiner

*Primary Examiner* — Jared J Fureman
*Assistant Examiner* — Dru M Parries
(74) *Attorney, Agent, or Firm* — Dority & Manning, P.A.

(57) ABSTRACT

A method and system for reducing the cost of a combined offshore wind generation plant is provided by coupling the AC output of plural wind turbine generators to a single AC-DC converter prior to transmission of the DC power to an onshore DC-AC inverter site. The wind speed is monitored at selected locations within the wind plant, optionally, at selected turbine generators, and the operating frequency of the AC-DC converter is adjusted in accordance with a combine wind speed signal to permit operation of the plural wind turbines as a group. AC-DC followed by DC-AC conversions decouples the AC frequency produced by the wind turbines and allows the turbines to operate at variable frequency as a group.

18 Claims, 1 Drawing Sheet

VARIABLE FREQUENCY WIND PLANT

FIELD OF THE INVENTION

The present invention relates generally to the field of wind generators, and, more particularly, to methods and systems to allow for reducing the cost of operation of plural wind generating plants and associated transmission systems.

BACKGROUND OF THE INVENTION

In distributed generation applications wherein the site for generation is remote from the available electric grid or load point, bulk power is often transmitted over long distances. In an offshore wind farm, for example, power generated by individual wind turbine generators is processed by power electronic converters to convert variable voltage, variable frequency output to fixed voltage, fixed frequency output. The outputs from the individual generators are synchronized to the utility network frequency even though the individual machines are running at different speeds and hence outputting different frequencies.

The power generated from the turbines is then brought together by a collection system that includes transformers and switchgear for isolating individual turbines and stepping up the voltages, usually to tens of kilovolts. The collection network is then cabled to an off-shore substation that boosts up the voltage further, usually to hundreds of kilovolts. It is then transmitted through subsea cable to an on-shore substation, where it is tied to the utility network through isolating switchgear and transformers.

For applications wherein bulk power is transmitted over long distances, conventional alternating current (AC) transmission provides technical challenges. Capacitance causes charging current to flow along the length of the AC cable. Because the cable must carry this current as well as the useful source current, this physical limitation reduces the source carrying capability of the cable. Because capacitance is distributed along the entire length of the cable, longer lengths result in higher capacitance and higher resulting charging current. As the cable system design voltage is increased to minimize the line losses and voltage drop, the charging current also increases.

DC transmission can be achieved more efficiently over longer distances than AC transmission. Medium voltage (MV) or high voltage (HV) DC transmission typically requires power electronic converters which are capable of converting between HVAC and HVDC. In conventional converter topologies, each switch of the converter is designed to handle high voltages which may range from tens of kilovolts to hundreds of kilovolts depending upon the application. Such switches are typically arranged with series connection of several semiconductor devices, such as insulated gate bipolar transistors (IGBTs) and thyristors.

In view of these known complexities involved with generation, collection and transmission of bulk power, there is a need for a method and system to reduce the cost of the combined wind generation plant and transmission system.

BRIEF DESCRIPTION OF THE INVENTION

Aspects and advantages of the invention will be set forth in part in the following description, or may be obvious from the description, or may be learned through practice of the invention.

One exemplary embodiment of the present disclosure is directed to a control method for a variable frequency wind plant, the wind plant comprising a plurality of variable frequency wind turbine generators. The method includes providing a wind speed signal from selected locations within the wind plant. For example, wind speed signals may be provided from individual wind speed measuring devices, for example, anemometers, positioned at selected locations within the wind plant or, optionally, associated with selected wind turbines. The output from the plurality of wind turbine generators is collected and applied to a common AC-DC converter. The operating frequency of the common AC-DC converter is adjusted based on a combined wind speed signal, so that the wind turbines may be operated at a variable frequency as a group.

In particular embodiments, the wind speed signals may also be used to adjust the individual speed of any one or group of the wind turbines.

In some of the embodiments, the plurality of variable frequency wind turbine generators have a fixed relationship between the turbine rotational speed and the frequency of the generated AC output, while in other embodiments variation in the relationship between turbine rotational speed and the frequency of the generated AC output is permitted.

In other embodiments, the method further provides transmitting the wind speed signals to a central control system that is configured to produce a signal to adjust the operating frequency of the common AC-DC converter. In specific embodiments, the wind speed signal is conveyed to the control system by one of wire, fiber optic, and radio communications.

Another exemplary embodiment of the present disclosure is directed to a power system that includes a plurality of variable frequency wind turbine generators, a plurality of wind speed measurement devices, an AC-DC converter, a collection system configured to collect generated power from each of the plurality of variable frequency wind turbine generators and apply the collected generated power to the AC-DC converter, and a control system configured to combine wind speed signals from the plurality of wind speed measurement devices into a combined wind speed signal and to generate a control signal for the AC-DC converter to control the operating frequency thereof based on the combined wind speed signal.

In certain embodiments, the power system also includes a DC-AC inverter coupled to the AC-DC converter by a DC transmission line, and an AC power grid, wherein the output frequency of the DC-AC inverter is configured to match the operating frequency of the AC power grid.

A further exemplary embodiment of the present disclosure is directed to a control method for a power system, where the power system comprises a converter configured to provide DC power from a plurality of AC power sources operating at variable frequencies, and an inverter configured to convert the DC power provided by the converter to AC power at a single nominal frequency, comprising producing signals based on a monitored variable associated with the operating frequency of selected of the plurality of AC power sources, applying power generated by each of the plurality of AC sources to the converter, and controlling the operating frequency of the converter in dependence on a combination of the signals produced. In selected embodiments the monitored variable may correspond to the rotational speed of a generator corresponding to selected of the plurality of AC power sources.

In selected embodiments, the control method employs a plurality of AC power sources corresponding to a plurality of AC power generating wind turbines and produces signals corresponding to signals based on wind velocity in the vicinity of selected of the plurality of AC power generating wind turbines.

Variations and modifications can be made to these exemplary embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
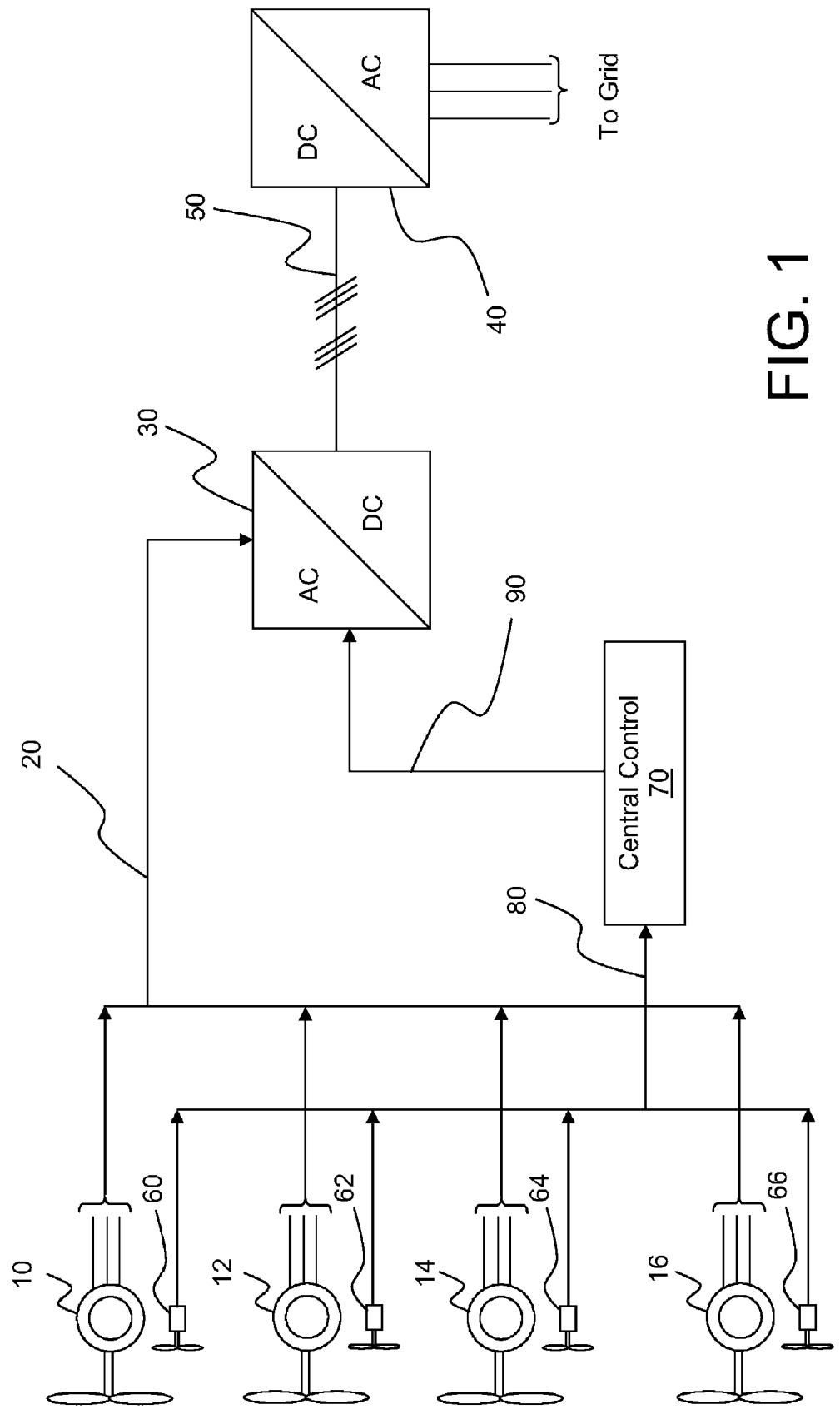
FIG. 1 is a schematic block diagram of a generation, collection, and bulk power transmission system in accordance with present technology.

Repeat use of reference characters throughout the present specification and appended drawings is intended to represent same or analogous features or elements of the invention.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention encompass such modifications and variations as come within the scope of the appended claims and their equivalents.

Generally, the present disclosure is directed to methods and apparatus for reducing the cost of a combined wind generation plant corresponding to a plurality of wind turbines or generators and an associated transmission system. The present technology provides for significant cost savings by employing a single AC-DC converter to connect a plurality of wind turbine generators to a DC transmission line. By such technique, DC power may be transmitted to a remote conversion location where the DC power is converted to AC for delivery to an AC grid.

An aspect of the present subject matter is that the conversion of AC to DC and from DC back to AC decouples the AC frequency produced by the wind turbines from the AC frequency of the remote AC grid. This allows the wind turbines to operate at a variable frequency, as a group, to achieve many of the efficiency advantages of variable speed operation of the wind turbines without the burden of providing power conversion functionality at each wind turbine in order to permit variable speed operation in a fixed-frequency collection system.

The individual wind turbines could use synchronous generators, permanent magnet generators, or generators with limited speed variation such as induction generators. The frequency of the offshore collection system is chosen such that the rotational speed of the wind turbines are optimized as a group. Where the generator of each wind turbine allows limited variation in speed, this speed variation can be applied for mechanical oscillatory damping, loads management, or further optimizing of the speed of the individual wind turbine generator.

It should be appreciated that while the present subject matter is described as relating to offshore collection systems, such technology is equally applicable to land based installations so that the offshore aspect of the described subject matter is not to be considered a specific limitation of the present subject matter.

With reference now to FIG. 1, it will be seen that there is illustrated a schematic block diagram of a generation, collection, and bulk power transmission system in accordance with present technology. The various components of the system include a plurality of wind turbines 10, 12, 14, 16, each having a generator that has a fixed relationship between the turbine rotational speed and the frequency of the generated AC output. Alternatively, the generator may correspond to one that allows a small degree of variation in this relationship between rotational speed and AC frequency, but which does not pass all of the power output generated by the wind turbine through a power electronic conversion process at each individual wind turbine generator.

The present subject matter also provides a collection system consisting of cables or lines 20 that connect the output of the individual wind turbine generators 10, 12, 14, 16 to a central power rectifier 30. Those of ordinary skill in the art will appreciate that while a single line is illustrated in the FIGURE to represent the collection system, such is intended to represent a plural phase AC collection system.

The collection system cables or lines 20 convey the generated power to central power rectifier 30 where the variable-frequency power produced by wind turbines 10, 12, 14, 16 is converted to direct current at a suitable voltage for transmitting the power to remote inverter 40 or a multiplicity of such inverters. Inverter 40 is provided to convert the power from DC to AC at a frequency and voltage compatible with the AC grid to which they are connected. A DC line or cable 50 is provided to transmit the power from the rectifier 30 to inverter (s) 40.

In accordance with the present subject matter, a device to sense wind velocity is provided at the location of each wind turbine 10, 12, 14, 16. In an exemplary configuration, the wind speed sensing device may correspond to anemometers 60, 62, 64, 66. Alternatively, wind speed sensing devices may be separately placed at selected locations within the wind plant. Such separate placement may or may not be in association with any particular wind turbine and may or may not correspond in number to the number of wind turbines within the wind plant.

Central control system 70 is configured to determine the desired operating frequency of the AC collection system such that the power output, mechanical loads, or efficiency of the wind turbines 10, 12, 14, 16 are collectively optimized. A communication device 80 is provided to transmit wind velocity measurements from anemometers 60, 62, 64, 66 to central control system 70. In exemplary configurations, communications device 80 may include, but is not limited to, wire, fiber optic, and wireless transmission such as radio communications. It is noted that the terms wind velocity and wind speed as variously used herein are viewed for present purposes as synonymous terms.

Central control 70 includes a system for controlling rectifier 30 by way of control link 90 that establishes the operating frequency of the AC collection system. Anemometers 60, 62, 64, 66 measure the wind velocity at each of the wind turbines 10, 12, 14, 16, or, optionally, at selected locations within the wind plant and transmit the wind speed data to the central control system 70 via the communications link or system 80. Central control system 70 determines the AC frequency at which the local system composed of the wind turbines 10, 12, 14, 16 and collection system 20 should be operated such that the speed of the wind turbines optimizes power production, mechanical load mitigation, or efficiency of the wind turbines 10, 12, 14, 16 as a collective group. The individual wind turbines 10, 12, 14, 16 may have the ability to adjust their individual speed over a limited range to further optimize power production, load management, or efficiency due to wind conditions local to the individual turbine.

Power rectifier 30 converts the variable frequency AC power generated by wind turbines 10, 12, 14, 16 to direct current at a high voltage of magnitude suitable for transmission of the power to a remote location over DC line or cable 50. At the remote termination or terminations of line or cable 50, the power is converted to AC by inverter 40 at an appropriate voltage and frequency for delivery to loads via an AC transmission system.

As previously noted, the present technology may be most advantageously employed in an offshore wind plant application due to the fact that DC transmission of the power from the offshore wind plant is often favored or necessary due to the requirement to use a long insulated cable to bring the power ashore. Where DC transmission is used with a conventional fixed-frequency collection system design, some form of conversion is needed at each wind turbine in order to facilitate variable speed operation, and the power is converted again to connect the offshore collection system to a DC cable. Another reason that the present technology could have particular application offshore is that offshore wind speed is generally more uniform than in an onshore wind plant, due, at least in part, to the lack of orographic features. Under such offshore operating conditions, it may be advantageous to employ only a relatively small number of wind speed sensors to achieve desired operational characteristics as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control method for a variable frequency wind plant, the wind plant comprising a plurality of variable frequency wind turbine generators, comprising:
   measuring wind speed at a plurality of selected locations within the wind plant and generating respective wind speed signals indicative of the measured wind;
   collecting and applying the output from each of the plurality of wind turbine generators to a common AC-DC converter; and,
   adjusting the operating frequency of the common AC-DC converter based on the plurality of measured wind speed signals,
   whereby the wind turbines are operated at a variable frequency as a group.

2. The method of claim 1, wherein measuring wind speed and generating wind speed signals comprises:
   providing a wind speed signal from a plurality of anemometers associated individually with selected of the plurality of wind turbine generators.

3. The method of claim 1, further comprising configuring selected of the plurality of variable frequency wind turbine generators to adjust their individual speed based on wind speed signals local to the individual turbine.

4. The method of claim 1, wherein each of the plurality of variable frequency wind turbine generators has a fixed relationship between the turbine rotational speed and the frequency of the generated AC output.

5. The method of claim 1, wherein selected of the plurality of variable frequency wind turbine generators correspond to generators configured to permit variation in the relationship between turbine rotational speed and the frequency of the generated AC output.

6. The method of claim 1, further comprising:
   providing a central control system;
   transmitting the plurality of wind speed signals to the central control system; and,
   configuring the central control system to produce a signal to adjust the operating frequency of the common AC-DC converter.

7. The method of claim 6, wherein transmitting the plurality of wind speed signals comprises conveying the wind speed signals to the central control system by one of wire, fiber optic, and radio communications.

8. A power system, comprising:
   a plurality of variable frequency wind turbine generators;
   a plurality of wind speed measurement devices that measure wind speed and generate a corresponding wind speed signal;
   an AC-DC converter;
   a collection system configured to collect generated power from each of said plurality of variable frequency wind turbine generators and apply the collected generated power to said AC-DC converter; and,
   a control system configured to combine the wind speed signals from said plurality of wind speed measurement devices into a combined wind speed signal and to generate a control signal for said AC-DC converter to control the operating frequency thereof based on the combined wind speed signal.

9. The power system of claim 8, wherein each of the plurality of variable frequency wind turbine generators has a fixed relationship between the turbine rotational speed and the frequency of the generated AC output.

10. The power system of claim 8, wherein selected of the plurality of variable frequency wind turbine generators correspond to generators configured to permit variation in the relationship between turbine rotational speed and the frequency of the generated AC output.

11. The power system of claim 8, wherein wind speed signals from said plurality of wind speed measurement devices are conveyed to the control system by one of wire, fiber optical, and radio communication.

12. The power system of claim 11, wherein the plurality of wind speed measurement devices correspond to a plurality of anemometers.

13. The power system of claim 11, wherein selected of the plurality of wind speed measurement devices are associated with selected of the variable frequency wind turbine generators.

14. The power system of claim 8, further comprising:
   a DC-AC inverter coupled to said AC-DC converter by a DC transmission line, and,
   an AC power grid, wherein the output frequency of said DC-AC inverter is configured to match the operating frequency of the AC power grid.

15. A control method for a power system, the power system comprising a converter configured to provide DC power from a plurality of AC power sources operating at variable frequencies, and an inverter configured to convert the DC power provided by the converter to AC power at a single frequency, comprising:

producing signals based on a measured variable associated with the respective operating frequency of selected ones of the plurality of AC power sources;

applying power generated by each of the plurality of AC sources to the converter;

controlling the operating frequency of the converter in dependence on a control signal generated by combining the signals produced; and wherein the plurality of AC power sources correspond to a plurality of AC power generating wind turbines and wherein producing signals corresponds to producing signals based on measured wind speed in the vicinity of the selected ones of the plurality of AC power generating wind turbines.

16. The method of claim 15, wherein each of the plurality of AC power generating wind turbines has a fixed relationship between the turbine rotational speed and the frequency of the generated AC power.

17. The method of claim 15, wherein selected of the plurality of variable frequency wind turbine generators correspond to generators configured to permit variation in the relationship between turbine rotational speed and the frequency of the generated AC output.

18. The method of claim 15, wherein producing signals comprises producing signals based on wind speed local to selected of the plurality of AC power generating wind turbines.

* * * * *